INVENTOR.
WILLIAM E. BRADLEY
BY
Allen V. Hazeltine
ATTORNEY

June 15, 1954

Filed Aug. 11, 1950

W. E. BRADLEY

INTERSTAGE COUPLING NETWORK HAVING IMPROVED PHASE RESPONSE 2,681,391

2 Sheets-Sheet 2

INVENTOR.
WILLIAM E. BRADLEY
BY
Dean V. Hazeltine
ATTORNEY

Patented June 15, 1954

2,681,391

UNITED STATES PATENT OFFICE 2,681,391

INTERSTAGE COUPLING NETWORK HAVING IMPROVED PHASE RESPONSE

William E. Bradley, Newtown, Pa., assignor to Philco Corporation, Philadelphia, Pa., a corporation of Pennsylvania Application August 11, 1950, Serial No. 178,784

5 Claims. (Cl. 179—171)

The invention herein described and claimed relates to electrical signal transfer networks, and in particular to such networks which are particularly adapted for use in the intermediate frequency amplifier circuits of television receivers.

In conventional television transmission, the several channels assigned for use by different transmitting stations are located closely adjacent each other in the frequency spectrum. This imposes stringent requirements upon the design of television receiving equipment, and particularly on the design of intermediate frequency amplifiers employed in such equipment, if undesirable interference between signals in adjacent channels is to be avoided. More particularly, the location of the sound carrier of one channel is ordinarily located very close to one extremity of the adjacent picture channel. This requires that the intermediate frequency amplifier of a television receiver be designed not only to transmit effectively the frequency components within the desired picture channel, but also to provide maximum rejection of the undesired adjacent sound carrier frequency. To this end, it has been customary in the past to provide, in television intermediate frequency amplifier circuits, a rejection or trap circuit to provide high attenuation of this undesired sound carrier frequency. Such circuits are customarily resonant circuits, of one form or another, having extremely high sensitivity, by reason of which they tend undesirably to modify the frequency response characteristic of the intermediate frequency amplifier within the desired picture channel. More particularly, they have a tendency substantially to reduce the frequency response at the extremity of the channel which is adjacent to the undesired sound carrier frequency. It has been customary in the prior art to compensate for this undesired modification in the picture channel response by the inclusion of circuits to provide an additional pole or resonance in the vicinity of this extremity of the picture channel to boost the response in that region. Unfortunately this expedient has had the undesirable effect of adversely modifying the phase response characteristic of the intermediate frequency amplifier within the desired picture channel so as to render it non-linear. While various expedients have been resorted to in the past to overcome this difficulty, none of them have proved entirely satisfactory.

Accordingly it is the primary object of my invention to provide an electrical signal transfer network for providing a desired signal transfer characteristic throughout a predetermined first frequency band, for providing high attenuation of signals in a second closely adjacent band, and for providing a desirably linear phase response characteristic throughout said first frequency band.

More particularly, it is an object of my invention to provide an improved television intermediate frequency amplifier having a predetermined desired and preferably uniform amplitude versus frequency response characteristic for signal frequency components within a given channel, having a substantially linear phase characteristic for frequency components within said channel, and adapted effectively to reject a sound carrier frequency located in an adjacent channel.

Briefly, these objectives are achieved in accordance with the present invention by the inclusion in the signal transfer network of circuits which are effective to produce a "pole" in its transfer impedance characteristic which lies in the band between the extremity of the desired passband and the frequency to which the adjacent channel rejection or trap circuit is tuned. Such a circuit differs from those of the prior art, as above discussed, in which circuits were included for producing an additional pole within the desired passband and in the vicinity of the extremity closest to the frequency to which the rejection or trap circuit was tuned. Such an arrangement, it has been found, is effective to compensate for the undesired modification of the frequency response characteristic within the desired passband which is produced by the inclusion of the adjacent channel rejection circuit, while at the same time maintaining a suitably linear phase response characteristic within the desired passband.

Before proceeding to the detailed description of the various embodiments of my invention, it will be conducive to a better understanding thereof, to review some of the fundamental concepts relating thereto.

To begin with, it will be recalled that the transfer impedance of a network is the ratio of the output voltage of the network produced in response to a predetermined input current supplied thereto. This is algebraically represented by the expression $$Z_T=\frac{E_o}{I_i} \qquad (1)$$

where $Z_T$ is the aforementioned transfer impedance,
$E_o$ is the output voltage and
$I_i$ is the input current of the network.

When, as is the case with television I.-F. amplifiers, the network contains reactive as well as resistive circuit elements, $Z_T$ is a complex quantity having both real and imaginary terms.

With the above definition of the transfer impedance in mind, it is generally more informative to express the ratio of voltage to current in terms of the actual component impedances of the network. This can always be done by conventional methods of circuit analysis and is hereinafter carried out, by way of example, for several actual networks.

It is then further well known that such an expression for $Z_T$ can always be put into the form $$Z_T=K\frac{(\lambda-\lambda_{01})(\lambda-\lambda_{02})(\lambda-\lambda_{03})}{(\lambda-\lambda_{p1})(\lambda-\lambda_{p2})(\lambda-\lambda_{p3})} \qquad (2)$$

where $\lambda$ is a complex quantity of the form $\alpha+j\omega$ and K is a constant not involving $\lambda$.

Incidentally $j$ and $\omega$ are quantities well known in the art, $j$ being the square root of $-1$ and $\omega$ being the product of frequency and $2\pi$.

The numerator of Equation 2 and, with it, the transfer impedance $Z_T$ evidently goes to zero whenever $\lambda$ equals $\lambda_{01}$, $\lambda_{02}$, $\lambda_{03}$, and so forth. Similarly the denominator of Equation 2 goes to zero and the transfer impedance goes to infinity when $\lambda$ equals $\lambda_{p_1}$, $\lambda_{p_2}$, $\lambda_{p_3}$, etc. A "pole" is said to exist, in the transfer impedance characteristic, at each frequency for which the latter condition obtains, namely for which $\lambda$ equals $\lambda_{p_1}$, $\lambda_{p_2}$, $\lambda_{p_3}$, etc. At these frequencies, the transfer impedance passes through a maximum. On the other hand, a "zero" is said to exist at each frequency for which the former condition obtains, namely for which $\lambda=\lambda_{01}$, $\lambda_{02}$, $\lambda_{03}$, etc. At "zero" frequencies, the transfer impedance passes through a minimum.

Since any given network gives rise to only one expression of the form of Equation 2, such a network has a transfer impedance characterized by a distinctive pole and zero pattern. From this pattern, both the amplitude and phase response of the network may be computed by simple graphical methods which are in current use in a wide segment of the network design field. Thus, a given pole and zero pattern is characteristic of a given amplitude and phase response of a network. Conversely, a network may be fully described, so far as its significant operational characteristics, namely, phase and amplitude response are concerned, by specifying the pole and zero pattern of its transfer impedance characteristic.

As hereinbefore indicated, the objectives of my invention are realized by a network whose transfer impedance characteristic has a pole and zero pattern distinguished by the presence of a pole within the range of frequencies intermediate the end of the amplifier passband and the adjacent channel trap circuit.

For a better understanding of the reasons for this choice of pole pattern and of the novelty residing therein, reference may now be had to the subsequent discussion in conjunction with the accompanying drawings, wherein.

Figure 1:
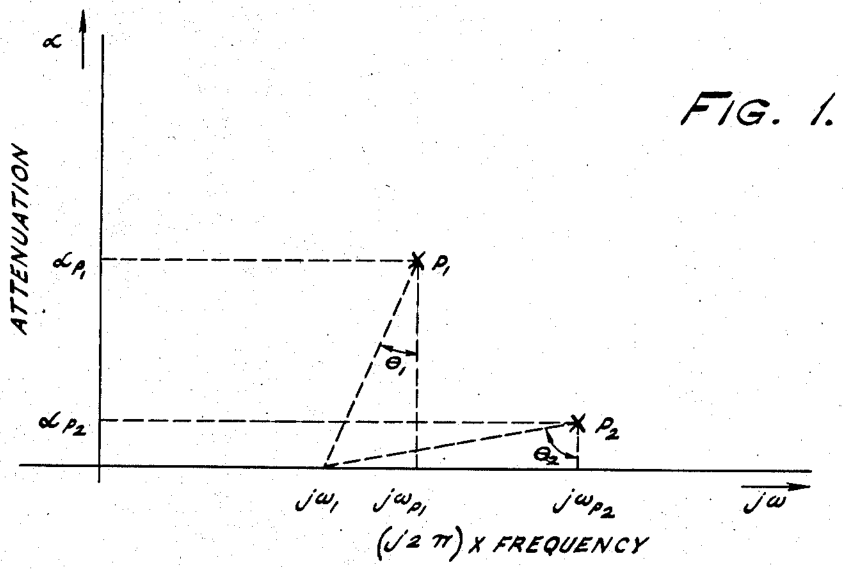
Figure 1 is illustrative of the theoretical considerations underlying the novel features of my network.

Referring more particularly to Figure 1 of the drawings, there is shown therein a system of orthogonal coordinates as commonly used for the graphical representation of the poles and zeros of electrical networks. Since, as hereinbefore described, poles and zeros are defined by certain critical values of $\lambda$ in the solution of Equation 2, it suffices, for a complete definition of each pole and zero, to plot the real and imaginary parts of the complex expression for each such critical value of $\lambda$. Accordingly, the vertical axis of the coordinate system of Figure 1 is calibrated in terms of the real portion of $\lambda$, which is $\alpha$ as hereinbefore defined, increasing values of $\alpha$ being plotted in an upward direction from the origin of the coordinate system. The imaginary part of $\lambda$, which is $j\omega$, is plotted along the horizontal axis, increasing positive values of $j\omega$ extending to the right of the aforementioned origin. In this connection it is useful to note that values of $\lambda$ plotted in this system of coordinates have a very real meaning in terms of the transmission characteristics of the network with which they are associated. Thus the position of the plotted value of $\lambda$ measured along the $j\omega$ axis is directly proportional to and may be interpreted in terms of the frequency at which the particular pole, or zero as the case may be, occurs, while its position along the $\alpha$ axis is proportional to the magnitude of the resistive attenuation which the network presents to signals to be transmitted therethrough at the particular frequency involved. Thus, the further the pole, or zero, is displaced from the origin along the $\alpha$ axis the higher will be the attenuation of the network on signals transmitted therethrough and the lower the Q of the network. Broadly speaking, then, the proximity of the pole or zero to the origin measured along the $\alpha$ axis is indicative of the selectivity of the circuit which produces the pole or zero, increasing displacement from the origin indicating decreasing selectivity of the network.

Proceeding now to the practical application of these criteria it will, first of all, be shown how pole and zero placement affects the phase and amplitude response of electrical networks. For this illustrative purpose a simple network consisting of an inductance and a capacitor connected in parallel has been chosen, this particular arrangement of circuit elements being basic to television I.-F. amplifiers. Incidentally, although such a parallel L.-C. network may not be provided with a separate resistor, some resistance will always be present therein, owing to the inherent resistance of the inductor and possibly to some leakage resistance in the capacitor. This resistive component may for all practical purposes, be considered as a lumped resistance in parallel with the capacitor and the inductor. Its presence gives rise to the resistive losses which lower the Q of the network from what the same would be in the absence of such resistance.

A parallel L.-C. network as here described is generally called a "single tuned circuit." As may readily be demonstrated, such a single tuned circuit has a transfer impedance which is characterized by a single pole or zero, as the case may be, on the positive side of the $j\omega$ axis of the coordinate system shown in Figure 1. Whether this network produces a pole or a zero depends upon the manner in which it is connected in the path of signals to be transmitted therethrough. Specifically, if the entire network is connected in shunt with this signal path then its transfer impedance will have a maximum, or pole, whereas if it is connected in series with the signal path it will be characterized by a minimum, or zero. This is readily apparent from elementary tuned circuit considerations, as it is well known that a single tuned circuit connected in shunt with a signal path has a single resonant frequency at which its amplitude response is a maximum, thus evidencing the presence of a pole. Needless to say, this reasoning is borne out by mathematical analysis. Similarly, it is well known that a single tuned resonant circuit connected in series with a signal path resonates at a given frequency, at which its amplitude response is a minimum, thus evidencing the presence of a zero. This again is, of course, substantiated by mathematical analysis.

It will be seen, from the foregoing discussion, that a single tuned resonant circuit serially connected in the signal path readily lends itself to use as an adjacent channel trap circuit, as hereinbefore defined, and such a circuit is in fact so utilized in certain embodiments of my invention. Such a trap circuit has, preferably, low resistive losses for then its amplitude response will be extremely low for signals of its zero frequency. Since it is normally difficult to obtain resonant circuits having such low losses and since such low losses with their attendant high Q and good attenuation are essential for use with adjacent channel trap circuits for television I.-F. amplifiers, special precautions were taken in this particular case to reduce the resistive losses of the trap circuit to a minimum. The detailed manner of carrying out this neutralization of the losses is, incidentally, well known and does not constitute a part of my invention. Its detailed explanation is therefore relegated to a later point in this discussion. Suffice it to say, for the time being, that the losses of the trap circuit are extremely low with the result that the same is highly selective and strongly attenuates signals at its zero frequency. As indicated, it is precisely under these conditions of low losses or high selectivity that the improvements effected by my novel circuit arrangement are most conspicuous.

Considering now the phase shift to which a particular frequency component will be subjected by the poles or zeros variously disposed with respect to it of a signal transfer network traversed by it, it will be seen from the diagram of Fig. 1, that the phase shift to which a frequency component corresponding to the point labeled $j\omega_1$ on the horizontal axis will be subjected by a complex pole $p1$ having the coordinates $\alpha_p$, and $j\omega p_1$, is equal to the angle $\theta_1$ included between a line connecting the pole $p1$ with $j\omega_1$, and a perpendicular from the pole to the $j\omega$ axis. Similarly the phase shift to which the same frequency component will be subjected by a pole $p2$ having the coordinates $\alpha_{p_2}$ and $j\omega_{p_2}$, which is further displaced along the horizontal axis, is equal to the angle $\theta_2$ included between a line connecting the pole $p2$ with $j\omega_1$ and a perpendicular from this pole to the $j\omega$ axis. Thus it is seen that the rate of change of phase shift with frequency due to a given pole decreases rapidly with increasing separation of the two along the horizontal axis. However it is also to be noted that, if the pole lies on the horizontal axis, it will have a constant phase-shifting effect at frequencies on the same horizontal axis. Further it will be noted that zeros in the transfer impedance characteristic of the network will have similarly varying phase-shifting effects depending upon their locations with respect to the frequency component in question. However, while a pole located at a given point will produce a phase shift in one sense, a zero located at the same point will produce a like phase shift in the opposite sense.

Next, with regard to the effect of a particular pole or zero on the amplitude of a given frequency component, it is to be noted that, while this likewise diminishes with increasing separation, between the pole or zero and the frequency component, measured along the horizontal axis, the rate of decrease is not as rapid as it is in the case of the effect of the pole or zero on phase.

Consider now the application of these principles to the prior art and to circuits in accordance with the present invention. In the prior art it was considered necessary to provide a pole in the transfer impedance characteristic of a television intermediate frequency amplifier at a point within the desired picture frequency band and adjacent the extremity of that band nearest to the undesired adjacent channel sound carrier frequency in order to compensate for the tendency of the sound carrier rejection circuit to modify the amplitude response of the picture channel in that region. By reason of the location of this pole within the band, it had a substantial effect in adversely modifying the phase response characteristic for signal frequency components within said band. In accordance with the present invention, however, the additional pole in the transfer impedance characteristic is located not within the desired picture frequency passband, but rather between the upper extremity of that band and the frequency of the adjacent channel sound carrier. This is clearly illustrated in Fig. 2 which shows the basic pole and zero pattern of the transfer impedance of a television intermediate frequency amplifier constructed in accordance with the present invention. As shown in this diagram, this characteristic has a pole $p3$ located near the lower extremity of the picture frequency passband and a zero located at the frequency $j\omega_0$ corresponding to the frequency of the adjacent sound frequency carrier to be rejected, as in the case of prior art circuits. However, the pattern is further characterized in having an additional pole $p4$ located in the region between the upper extremity of the passband and the adjacent sound carrier frequency. In this respect, the pattern differs significantly from the pole and zero pattern of a conventional intermediate frequency amplifier circuit in accordance with the prior art. Although this additional pole is located externally of the picture frequency passband, it still has, as above indicated, a substantial effect in compensating the reduction in the amplitude response throughout the higher frequency portion of the picture frequency passband which the zero of the adjacent channel sound rejection circuit tends to produce. However, by reason of its location in this position its effect on the phase characteristic within the picture frequency passband is substantially less than would be the case if it were located within that passband, and, in particular, it does not appreciably adversely affect the linearity of the phase characteristic.

Thus it is seen that while the prior art teaches that the additional pole should be located within the picture frequency passband in order to secure the desired compensation of the amplitude response characteristic within that band, I have taught that substantially the same results in respect of amplitude response may be obtained by locating the additional pole outside the passband, with the additional advantage that the phase response characteristic within the passband is not adversely affected. In fact it may be observed that although the effect on the amplitude response characteristic of a pole located outside the passband will, in general, be somewhat less than that of a similar pole located within the passband, this discrepancy may be compensated for by appropriately increasing the Q of the circuits which produce the pole, and hence the same overall compensating effect may be obtained as is obtained when a pole is located internally of the passband.

It will be understood that, in the actual design of an amplifier in accordance with the invention, the particular pole and zero positions selected may be governed to a large extent by ancillary considerations, provided only that the afore-described pole placement outside the passband is secured.

Figure 3:
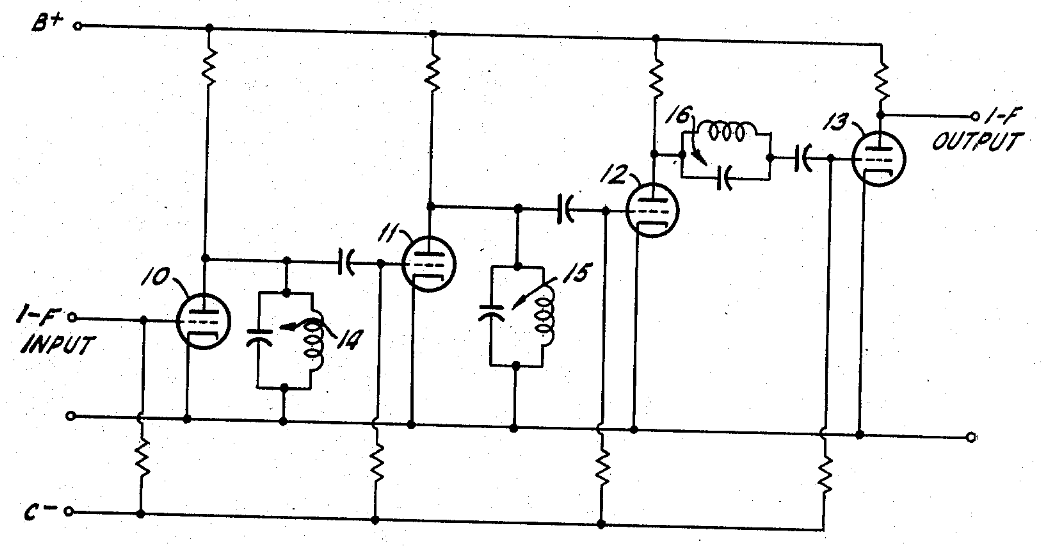
Figure 3 shows a basic embodiment of a network constructed in accordance with the invention.

Proceeding now to the consideration of actual circuit arrangements embodying my inventive concept, reference may first be had to Figure 3 of the drawings where there is illustrated a basic form which such an embodiment may take in practice. The circuit there illustrated is that of a television I.-F. amplifier having four stages of amplification interconnected by three separate coupling networks. The signal path thus formed begins at the control grid of triode 10 to which I.-F. signals derived from preceding stages of the receiver are applied, and leads from there through triodes 11, 12 and 13, all connected in cascade, to the output of the network whence it is supplied to whatever circuits conventionally follow the I.-F. amplifier. A parallel inductance-capacitance network, or single tuned circuit 14, shunts the signal path between the anode of triode 10 and the grid of triode 11. Another single tuned circuit 15 shunts the signal path intermediate the anode of triode 11 and the control grid of triode 12, while the third single tuned circuit 16 is connected in series with the signal path between the anode of triode 12 and the control grid of triode 13. In addition, suitable conventional anode load resistors are provided for each triode whereby the respective anodes are connected to a common source of positive potential B+. Similarly, the control grid electrodes of all the triodes are connected, through suitable individual grid leak resistors, to a common source of negative grid potential C−. Conventional D.-C. blocking capacitors are, of course, also provided, intermediate the anode of each triode and the control grid of the following triode, to prevent the deleterious application of B+ potential to the latter.

In this network the only elements which are frequency sensitive are single tuned circuits 14, 15 and 16, the vacuum tubes being provided not only for the purpose of amplification of the signal but also to prevent interaction between these tuned circuits which would disturb their simple single tuned characteristic.

As has been explained, hereinbefore, a single tuned circuit connected in shunt with the signal path has a transfer impedance characterized by a single pole at the resonant frequency of the circuit, whereas a single tuned circuit connected in series with a signal path has a transfer impedance characterized by a single zero, again at its resonant frequency. Accordingly, in the embodiment under consideration, tuned circuits 14 and 15 are tuned, respectively, to the frequencies of the two poles which my coupling network must have to conform with my inventive concept, whereas tuned circuit 16 is made resonant at the zero frequency of my network. In the practical case of an I.-F. amplifier for television have a passband of 4.5 megacycles extending between the limits of 22.1 megacycles and 26.6 megacycles and which is required to eliminate signals of the adjacent channel sound frequency of 28.1 megacycles, tuned circuit 14 may be made resonant at a frequency near the lower end of this passband and within the passband; a typical value to which this circuit may be tuned for good results is 26 megacycles. The adjacent channel sound trap circuit, which is, in this embodiment, constituted by tuned circuit 16 in series with the signal path is, of course, made resonant at the frequency of the adjacent channel sound carrier, in this case 28.1 megacycles. The remaining resonant circuit, namely tuned circuit 15 connected in shunt with the signal path is, in accordance with the invention, made resonant at a frequency lying between the end of the passband and the adjacent channel trap frequency, in this case between 26.6 megacycles and 28.1 megacycles. A suitable frequency to which such a circuit may be turned, within this range, is 27.6 megacycles, this being sufficiently close to the adjacent channel trap frequency to provide all the advantages conferred by a circuit constructed in accordance with my teachings.

It is emphasized, in this connection, that the particular values of resonant frequencies given are simply illustrative of one particular arrangement which has been successfully used, it being well understood that specific requirements relating to the amplitude and phase response of the amplifier within its passband may be met by suitable adjustment of the resonant frequencies of the tuned circuits as well as of their resistive attenuation characteristics, within the limits of my teachings. Further, it will be understood that the positions of the various tuned circuits in the network of Fig. 3 may be interchanged without, in any way, deleteriously affecting the operation of the circuit.

As has been seen, the simplified embodiment shown in Fig. 3 requires, in addition to the three tuned circuits which produce the pole and zero pattern, four vacuum tubes to produce the necessary isolation therebetween. Since it is often desirable to reduce the cost of such equipment, as well as its complexity, by maintaining the number of circuit components at a minimum, the preferred embodiment of the invention employs only two vacuum tubes in addition to three tuned circuits required to produce the pole and zero pattern.

Figure 4:
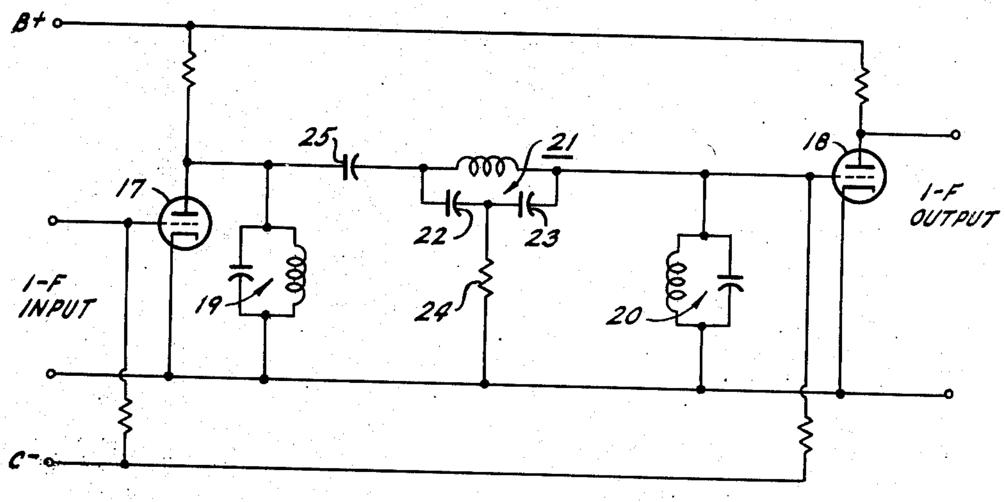
Figure 4 shows a preferred embodiment of the invention.

A specific circuit of this nature is illustrated in Fig. 4 to which more detailed reference may now be had. The signal path formed by this amplifier is seen to comprise an input triode 17 to whose control grid electrode I.-F. input signals derived from preceding stages of the receiver are supplied. Anode signals produced in response thereto are then transmitted to the control grid of output triode 18 from whose anode, in turn, corresponding I.-F. output signals are derived. The network interconnecting the anode of tube 17 and the control grid of tube 18 comprises, in this preferred embodiment, a pair of single tuned circuits 19 and 20 connected in shunt with the signal path, together with another single tuned circuit 21 connected in series with the signal path. It will be noted that, in this particular embodiment, the series connected single tuned circuit is somewhat modified, from its conventional form, by substituting for the normally used single capacitor an equivalent series combination of two capacitors, respectively designated by reference numerals 22 and 23 from whose junction a resistor 24 is connected in shunt with the signal path.

circuits 19 and 20 are arranged to be resonant at the same frequency and to have substantially equal resistive losses, we may conclude that their individual poles will be at the same location so that $$\lambda_{19}=\lambda_{20} \tag{7}$$

Substituting in Equation 6 we obtain $$Z_t=M\frac{2C_{21}(\lambda-\lambda_{21})}{4C_{19}C_{20}(\lambda-\lambda_{19})^2+4C_{21}(C_{19}+C_{20})(\lambda-\lambda_{19})(\lambda-\lambda_{21})} \tag{8}$$

The manner in which this arrangement contributes to the satisfactory operation of the circuit is explained in detail hereinafter. In addition, there are, of course, provided the usual ancillary circuit components such as anode load resistors connecting each of triodes 17 and 18 to a source of positive anode potential B+, a D.-C. blocking capacitor 25 connected in series with the signal path for the purpose of preventing the anode potential of triode 17 from being applied to the control grid of tube 18, as well as suitable grid bias resistors connecting each of triodes 17 and 18 to a source of constant negative grid bias potential C−. It will now be shown how the criteria of pole analysis hereinbefore set forth and as restricted in accordance with the invention, are applied to the network under consideration so as to determine all of its essential design characteristics.

For this we first write the equation for the transfer impedance of the network, as hereinbefore defined in Equation 1 and we obtain, in accordance with well known principles of network analysis, that $$Z_t=M\frac{Y_{21}}{(Y_{19}+Y_{21})(Y_{20}+Y_{21})-Y_{21}^2} \tag{3}$$

where $Y_{19}$ is the complex admittance of tuned circuit 19,
$Y_{20}$ is the complex admittance of tuned circuit 20,
$Y_{21}$ is the complex admittance of tuned circuit 21
and M is a constant introduced by the presence of triodes 17 and 18, and has no further bearing on the pole and zero analysis to follow.

It is well known that the admittance of a tuned circuit may be further defined, for purposes of pole and zero analysis, by the expression $$Y_n=2C_n(\lambda-\lambda_n) \tag{4}$$

where $Y_n$ is the admittance of the tuned circuit under consideration and identified by subscript $n$,
$C_n$ is its total parallel capacitance and
$\lambda_n$ is its individual complex pole location, as hereinbefore defined. In this connection, it must be kept in mind, that the pole location of each individual tuned circuit, acting alone, is not necessarily the same as that of the entire coacting network, but will merely be useful in solving for the latter.

Substituting this form of Y with appropriate identifying subscripts for each Y in Equation 3 we obtain Observe that, in Equation 8, the numerator is now already in the form prescribed by Equation 2 for the determination of zero locations. Accordingly, the zero of the entire network will be located at $\lambda_{21}$, or, in other words, at the resonant frequency of tuned circuit 21 alone, which thus constitutes the trap circuit of the network.

As has been pointed out, hereinbefore, it is desired, in the case of a television I.-F. amplifier, that the zero determined by this trap circuit be located as close to the $j\omega$ axis as practical, so that the signal attenuation due to the trap circuit will be a maximum. It is to achieve the necessary low resistive losses that the unusual arrangement of tuned circuit 21 hereinbefore outlined is provided. In this arrangement, the resistor 24 produces a bridge-like action, causing currents flowing in opposite directions in the tuned circuit to cancel, so that no net potential is developed across the resistance inherent in the coils of the tuned circuit. This results in the desired minimizing of resistive losses in the circuit so that its effectiveness as a trap circuit is considerably enhanced.

We can now concentrate on the determination of the relationship between the pole locations and the resonant frequencies of the tuned circuits, as evidenced by the denominator of Equation 8. Setting this denominator equal to zero, as indicated in the discussion of Equation 2, we obtain $$C_{19}C_{20}(\lambda-\lambda_{19})^2+C_{21}(C_{19}+C_{20})(\lambda-\lambda_{19})(\lambda-\lambda_{21})=0 \tag{9}$$

This is a second degree equation in $\lambda$, one of whose solutions is $$\lambda=\lambda_{19} \tag{10}$$

which therefore corresponds to the $\lambda_{p_1}$ of Equation 2. Thus, one of the poles will, as it happens, occur at the resonant frequency of either of tuned circuits 19 or 20.

Dividing Equation 9 by the term $(\lambda-\lambda_{19})$, we obtain $$C_{19}C_{20}(\lambda-\lambda_{19})+C_{21}(C_{19}+C_{20})(\lambda-\lambda_{21})=0 \tag{11}$$

The second solution of the equation will then be $$\lambda=\frac{A\lambda_{21}+\lambda_{19}}{A+1} \tag{12}$$

where $$A=\frac{C_{21}(C_{19}+C_{20})}{C_{19}C_{20}} \tag{13}$$

The $\lambda$ of Equation 12 then corresponds to the $$Z_t=M\frac{2C_{21}(\lambda-\lambda_{21})}{[2C_{19}(\lambda-\lambda_{19})+2C_{21}(\lambda-\lambda_{21})][2C_{20}(\lambda-\lambda_{20})+2C_{21}(\lambda-\lambda_{21})]-[2C_{21}(\lambda-\lambda_{21})]^2} \tag{5}$$

which, after collection of terms, becomes $$Z_t=M\frac{2C_{21}(\lambda-\lambda_{21})}{4C_{19}C_{20}(\lambda-\lambda_{19})(\lambda-\lambda_{20})+4C_{21}(\lambda-\lambda_{21})C_{19}(\lambda-\lambda_{19})+C_{20}(\lambda-\lambda_{20})} \tag{6}$$

Assuming now, as is often the case in practice to a sufficiently close approximation, that tuned $\lambda_{p_2}$ of Equation 2 and exhausts the number of solutions for Equation 9 and, with it, the number of poles of the network.

Since each λ is a complex quantity and since, in any equation, real and imaginary parts must both be equal, we can determine the frequency components of these λ's by concentrating on their imaginary parts.

Thus $$\lambda_{p1}=\alpha_{p1}+j\omega_{p1}=\lambda_{19}=\alpha_{19}+j\omega_{19} \quad (14)$$

and $$j\omega_{p1}=j\omega_{19} \quad (15)$$

Furthermore, $$f_{p1}=f_{19} \quad (16)$$

or one pole frequency equals the resonant frequency of tuned circuit 19, as hereinbefore indicated.

Similarly $\lambda_{p_2}$ may be analyzed to yield $$f_{p2}=\frac{Af_{21}+f_{19}}{A+1} \quad (17)$$

where $f_{p_2}$ is the frequency of the pole located at $\lambda_{p_2}$, $f_{21}$ is the resonant frequency of tuned circuit 21 and $f_{19}$ is the resonant frequency of tuned circuit 19.

Figure 2:
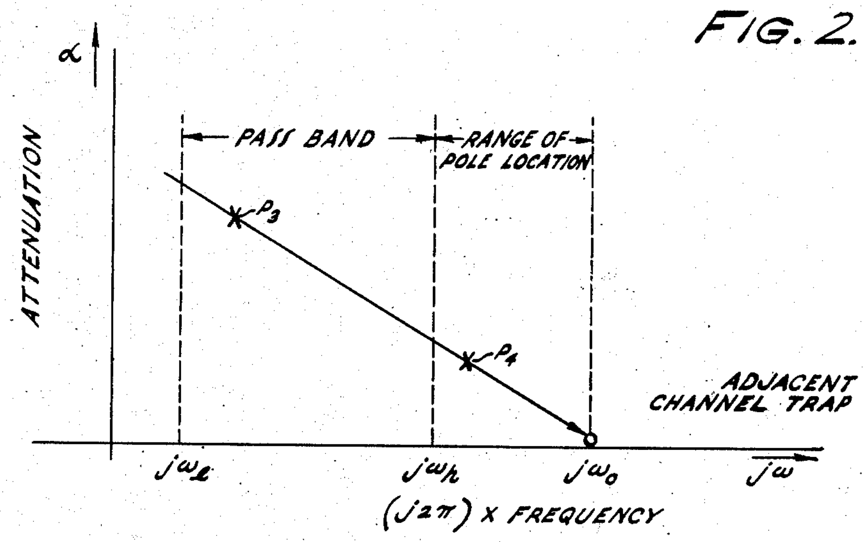
Figure 2 shows the pole and zero pattern of a network constructed in accordance with the invention as well as its departure from the prior art.

Simultaneous examination of Equations 16 and 17 reveals that it is the high frequency pole which is located at frequency $f_{p2}$. It is, then, this latter pole which must, in accordance with the invention, be located at a frequency between the end of the passband and the zero frequency. Thus the condition to be met is $$f_{p2}>f_h \quad (18)$$

where $f_h$ is the high frequency end of the passband corresponding to $j\omega_h$ of Figure 2.

Furthermore $$\frac{Af_{21}+f_{19}}{A+1}>f_h \quad (19)$$

Solving inequality (19) for A we obtain $$A=\frac{C_{21}(C_{19}+C_{20})}{C_{19}C_{20}}>\frac{f_h-f_{19}}{f_{21}-f_h} \quad (20)$$

Inequality (20) constitutes the basis for the design of the amplifier of Figure 4 in accordance with the invention, since, by conforming with its requirements, the high frequency pole of the network is placed between the end of the passband and the zero.

In practice, $C_{19}$ and $C_{20}$ are often constituted by the output capacitance of triode 17 and the input capacitance of triode 18, respectively, thus yielding values for these components of inequality (20) which are fixed by the choice of tubes. It then remains only to tune circuits 19 and 20 to the common frequency $f_{19}$ within the passband at which it is desired to locate the low-frequency pole. Since $f_h$ is determined by the desired bandpass characteristic of the network and $f_{21}$ by the frequency of the adjacent channel sound carrier which is to be trapped, the only variable in (20) is $C_{21}$, which is the total parallel capacitance of tuned circuit 21, as hereinbefore explained. Thus, by selecting the appropriate value of capacitance for the capacitor of tuned circuit 21 in addition to meeting the other requirements of inequality (20), of course, the pole will have been located at a frequency outside the passband. This frequency can, in the practical embodiment of the circuit of Figure 4, never reach the zero frequency for, to do so, capacitance $C_{21}$ would have to be infinite, clearly an impracticable condition. Thus, the requirement of pole location intermediate the end of the passband and the trap frequency is fully met by satisfying inequality (20).

Note, particularly, that not all of the poles which characterize the network of Figure 4 occur at the resonant frequency of some one of the component tuned circuits. It is for the more general case such as this, where various tuned circuits interact to produce a transfer impedance with poles at points other than the resonant frequencies, that the characteristics of my novel network must, to be definite and meaningful be defined in terms of its pole and zero pattern.

It will be seen, from the preceding discussion, that several circuit arrangements are available for producing the aforedescribed pole and zero pattern which characterizes my novel coupling network. As still other embodiments will occur to those skilled in the art, without departing from my inventive concept, I desire the latter to be bounded only by the appended claims.

I claim:

1. An interstage coupling network for transmitting signals within a predetermined frequency band with upper limit at frequency $f_0$, said network comprising: a pair of input terminals and a pair of output terminals, a pair of parallel-resonant circuits, both tuned to the same frequency $f_1$ within said frequency band, one of said pair of circuits being connected between said input terminals and the other of said pair of circuits being connected between said output terminals, and a third parallel-resonant circuit tuned to a frequency $f_2$ higher than $f_0$ and connected between one of said input terminals and one of said output terminals, the capacitances of said resonant circuits being related by the expression $$\frac{C_{12}(C_1+C_2)}{C_1C_2}>\frac{f_0-f_1}{f_2-f_0}$$

where $C_1$ is the capacitance of one of said pair of resonant circuits, $C_2$ is the capacitance of the other of said pair of resonant circuits and $C_{12}$ is the capacitance of said third resonant circuit.

2. In combination: a source of desired and undesired electrical signals in mutually exclusive frequency bands, said source having a pair of output terminals; and a network for deriving said desired signals from said source and for rejecting said undesired signals, said network having a pair of input terminals connected to said output terminals of said source, said network having a pair of output terminals, and said network having a transfer impedance between said input and output terminals characterized by a zero at a frequency within the frequency band of said undesired signals, by a first pole at a frequency within the frequency band of said desired signals and by a second pole between the frequency of said zero and the end frequency of said band of desired signals adjacent thereto.

3. In combination: a source of desired electrical signals within a relatively wide frequency band and of undesired electrical signals within a relatively narrow frequency band outside of and near to said band of desired signals, said source having a pair of output terminals; and a network for deriving said desired signals from said source and for rejecting said undesired signals, said network having a pair of input terminals connected to said output terminals of said source, said network having a pair of output terminals, and said network having a transfer impedance between said input and output terminals characterized by a zero at a frequency within said frequency band of undesired signals, by a first pole at a frequency within said frequency band of desired signals and by a second pole at a frequency between the frequency of said zero and the end of said frequency band of desired signals adjacent to said zero.

4. In combination: a source of desired and undesired electrical signals in mutually exclusive frequency bands, said source having a pair of output terminals; and a network having a pair of input terminals connected to said output terminals of said source and a pair of output terminals, said network forming a signal path between said network input terminals and output terminals transmissive of desired signals from said source and substantially non-transmissive of undesired signals from said source, said network comprising a plurality of impedance elements, each resonant at a predetermined frequency, one of said impedance elements being connected effectively in series with said signal path and two others of said impedance elements being connected effectively in shunt with said signal path, said series connected element being adjusted to resonance at a frequency within said band of undesired signals to produce a zero in the transfer impedance characteristic of said network at said frequency, and said shunt connected elements being adjusted to resonance at such frequencies that their resonances cooperate with the resonance of said series connected element to produce a first transfer impedance pole at a frequency within said band of desired signals and a second transfer impedance pole at a frequency between said zero frequency and the end of said desired band of signals adjacent to said zero frequency.

5. An electrical coupling network forming a signal path transmissive of signals in a predetermined frequency passband, said network comprising a plurality of vacuum tubes each having at least triode elements, said tubes being connected in cascade in said signal path, a first parallel resonant circuit connected in series with said signal path and tuned to resonance at a frequency outside said passband, a second parallel resonant circuit connected in shunt with said signal path and tuned to resonance at a frequency within said passband, and a third parallel resonant circuit connected in shunt with said signal path and tuned to resonance at a frequency between the resonant frequency of said first circuit and the end frequency of said passband adjacent thereto, only one of said resonant circuits being connected intermediate any two of said cascade-connected vacuum tubes.

References Cited in the file of this patent

UNITED STATES PATENTS

| Number | Name | Date |
|---|---|---|
| 1,434,555 | Martin | Nov. 7, 1922 |
| 1,955,788 | Bode | Apr. 24, 1934 |
| 1,964,990 | Hopkins | July 3, 1934 |
| 2,054,794 | Dietzhold | Sept. 22, 1936 |
| 2,321,291 | Grundmann | June 8, 1943 |
| 2,356,308 | Fredendall | Aug. 22, 1944 |
| 2,574,259 | Goldberg | Nov. 6, 1951 |